US010186168B2

(12) United States Patent
Gobert et al.

(10) Patent No.: US 10,186,168 B2
(45) Date of Patent: *Jan. 22, 2019

(54) INQUIRY SKILLS TUTORING SYSTEM

(71) Applicant: Worcester Polytechnic Institute, Worcester, MA (US)

(72) Inventors: Janice D. Gobert, Stow, MA (US); Michael A. Sao Pedro, Worcester, MA (US); Cameron Guerra Betts, Berlin, MA (US); Ryan S. Baker, Tarrytown, NY (US)

(73) Assignee: Worcester Polytechnic Institute, Worcester, MA (US)

( * ) Notice: Subject to any disclaimer, the term of this patent is extended or adjusted under 35 U.S.C. 154(b) by 40 days.

This patent is subject to a terminal disclaimer.

(21) Appl. No.: 15/388,295

(22) Filed: Dec. 22, 2016

(65) Prior Publication Data
US 2017/0103671 A1 Apr. 13, 2017

Related U.S. Application Data

(63) Continuation of application No. 15/159,539, filed on May 19, 2016, now Pat. No. 9,564,057, which is a
(Continued)

(51) Int. Cl.
*G09B 19/00* (2006.01)
*G06N 5/02* (2006.01)
(Continued)

(52) U.S. Cl.
CPC .............. *G09B 19/00* (2013.01); *G06N 5/022* (2013.01); *G06N 5/025* (2013.01);
(Continued)

(58) Field of Classification Search
USPC ............................................ 434/276; 706/46
See application file for complete search history.

(56) References Cited

U.S. PATENT DOCUMENTS

| 6,634,887 B1 | 10/2003 | Heffernan, III et al. |
| 8,262,447 B2 | 9/2012 | Murrell et al. |

(Continued)

FOREIGN PATENT DOCUMENTS

WO  WO 2014/120780 A1  8/2014

OTHER PUBLICATIONS

ISPRS Journal of Photogrammetry and Remote Sensing vol. 87, Jan. 2014, pp. 180-191 Geographic Object-Based Image Analysis—Towards a new paradigm Thomas Blaschke, Geoffrey J. Hay, Maggi Kelly, Stefan Lang, Peter Hofmann, Elisabeth Addink, Raul Queiroz Feitosa, Freek van der Meer, Harald van der Werff.*

(Continued)

*Primary Examiner* — Michael B Holmes
(74) *Attorney, Agent, or Firm* — Hamilton, Brook, Smith & Reynolds, P.C.

(57) ABSTRACT

An assessment engine includes a definition of inquiry skills being assessed. Assessment models are used to infer skill demonstration as one or more students engage in inquiry within computerized simulations and/or microworlds. A pedagogical agent and/or help system provides real-time feedback to one or more students based on the assessment model outputs, and/or based on additional models that track one or more students developing proficiency across inquiry tasks over time. A pedagogical agent and/or help system for science inquiry tutoring responds in real-time on the basis of knowledge-engineered and data-mined assessment and/or tracking models.

20 Claims, 9 Drawing Sheets

Related U.S. Application Data continuation of application No. 14/167,215, filed on Jan. 29, 2014, now Pat. No. 9,373,082.

(60) Provisional application No. 61/759,668, filed on Feb. 1, 2013.

(51) Int. Cl.
  *G09B 5/02* (2006.01)
  *G09B 7/02* (2006.01)
  *G09B 5/00* (2006.01)
  *G06Q 10/06* (2012.01)

(52) U.S. Cl.
  CPC ......... *G06Q 10/06398* (2013.01); *G09B 5/00* (2013.01); *G09B 5/02* (2013.01); *G09B 7/02* (2013.01)

(56) References Cited

U.S. PATENT DOCUMENTS

| | | | |
|---|---|---|---|
| 9,046,882 B2 | 6/2015 | Bartee et al. | |
| 9,144,129 B2* | 9/2015 | Munday | H05B 33/0803 |
| 9,230,221 B2* | 1/2016 | Gobert | G06N 99/005 |
| 9,317,115 B2* | 4/2016 | Gobert | G06F 3/013 |
| 9,373,082 B2* | 6/2016 | Gobert | G09B 5/00 |
| 9,564,057 B2* | 2/2017 | Gobert | G09B 5/00 |
| 9,730,282 B2* | 8/2017 | Munday | H05B 33/0803 |
| 2011/0053133 A1 | 3/2011 | Rock et al. | |
| 2013/0226845 A1* | 8/2013 | Gobert | G06N 99/005 706/12 |
| 2014/0222746 A1* | 8/2014 | Gobert | G09B 5/00 706/47 |
| 2014/0280564 A1* | 9/2014 | Darling | G06Q 50/01 709/204 |
| 2015/0382416 A1* | 12/2015 | Munday | H05B 33/0803 315/200 R |
| 2016/0026247 A1* | 1/2016 | Gobert | G06N 99/005 434/72 |
| 2016/0041099 A1 | 2/2016 | Parthasarathy et al. | |
| 2016/0073197 A1 | 3/2016 | Hammer et al. | |
| 2016/0260338 A1* | 9/2016 | Gobert | G09B 5/00 |
| 2017/0103671 A1* | 4/2017 | Gobert | G09B 5/00 |

OTHER PUBLICATIONS

ACM Digital Library Assessment design for emergent game-based learning Jodi Asbell-Clarke Elizabeth Rowe Elisabeth Sylvan TERC, Cambridge, Massachusetts, USA CHI EA '13 CHI '13 Extended Abstracts on Human Factors in Computing Systems pp. 679-684 Paris, France—Apr. 27-May 2, 2013.*

International Journal of Artificial Intelligence in Education Nov. 2013, vol. 23, Issue 1-4, pp. 94-114 Understanding and Predicting Student Self-Regulated Learning Strategies in Game-Based Learning Environments Jennifer L. Sabourin, Lucy R. Shores, Bradford W. Mott.*

IEEE A view on the methodology of analysis and exploration of marketing data Maciej Pondel ; Jerzy Korczak 2017 Federated Conference on Computer Science and Information Systems (FedCSIS) Sep. 3-6, 2017 Proceedings of the Federated Conference on Computer Science and Information Systems pp. 1135-1143.*

Notification of Transmittal of the International Search Report and The Written Opinion of the International Searching Authority for Int'l Application No. PCT/US2014/013615, "Inquiry Skills Tutoring System," dated Apr. 30, 2014.

Sao Pedro, M.A., et al., "Improving Construct Validity Yields Better Models of Systematic Inquiry, Even with Less Information," *User Modeling, Adaptation, and Personalization*, Lecture Notes in Computer Science vol. 7379:249-260 (Jul. 16, 2012).

Sao Pedro, M.A., et al., "Leveraging Machine-Learned Detectors of Systematic Inquiry Behavior to Estimate and Predict Transfer of Inquiry Skill," *User Modeling and User Adapted Interaction*, 23(1):1-39 (Sep. 17, 2011).

Gobert, Janice D., et al., "Leveraging Educational Data Mining for Real-Time Performance Assessment of Scientific Inquiry Skills within Microworlds," *Journal of Educational Data Mining*, 4(1):153-185 (Oct. 2012).

Gobert, J., et al., "From Log Files to Assessment Metrics: Measuring Students' Science Inquiry Skills Using Educational Data Mining," *Journal of the Learning Sciences*, 22(4): 521-563. Accepted version posted online Sep. 10, 2013.

Sao Pedro, M.A. "Real-time Assessment, Prediction, and Scaffolding of Middle School Students' Data Collection Skills within Physical Science Simulations," Social Science and Policy Studies: Learning Sciences and Technologies Program Ph.D. Dissertation. *Worcester Polytechnic Institute Technical Report* etd-042513-062949. Defense date: Apr. 17, 2013; available on WPI's website: (Apr. 25, 2013).

White, B.Y. and Frederiksen, J.R., "Inquiry, Modeling and Metacognition: Making Science Accessible to All Students," *Cognition and Instruction*, 16(1), 3-118 (Winter 1998).

Gobert, J.D., "Leveraging Technology and Cognitive Theory on Visualization to Promote Students' Science Learning and Literacy," *Visualization in Science Education*, 73-90 (Jan. 1, 2005).

McElhaney, K. and Linn, M., "Helping Students Make Controlled Experiments More Informative," *Learning in the Disciplines: Proceedings of the 9th International Conference of the Learning Sciences, International Society of the Learning Sciences*, 1: 786-793 (Jun. 29, 2010).

Van Joolingen, W. R. and de Jong, T., "SimQuest, Authoring Educational Simulations," T. Murray, S. Blessing, & S. Ainsworth, *Authoring Tools for Advanced Technology Learning Environments: Toward Cost-effective Adaptive, Interactive, and Intelligent Educational Software* (pp. 1-31). Dordrecht: Kluwer (Jan. 2003).

De Jong, T., et al., "Learning by Creating and Exchanging Objects: The SCY Experience," *British Journal of Educational Technology*, 41(6): 909-921. Published online Oct. 13, 2010.

Graesser A. and McNamara D., "Self-Regulated Learning in Learning Environments with Pedagogical Agents that Interact in Natural Language," *Educational Psychologist*, 45(4): 234-244 (Oct. 21, 2010).

Anjewierden, A., et al., "Brick: Mining Pedagogically Interesting Sequential Patterns," *Proceedings of Educational Data Mining* (Jul. 6, 2011).

Kim, Y., et al., "MathGirls: Motivating Girls to Learn Math through Pedagogical Agents," E. Pearson & P. Bohman (Eds.), *Proceedings of World Conference on Educational Multimedia, Hypermedia and Telecommunications*, Chesapeake, VA: AACE 2025-2032 (Jun. 2006).

Baker, R.S.J.d., et al.,"Adapting to When Students Game an Intelligent Tutoring System," *Proceedings of the 8th International Conference on Intelligent Tutoring Systems*, 392-401 (Jun. 26, 2006).

Robison, J., et al., "Modeling Task-Based vs. Affect-Based Feedback Behavior in Pedagogical Agents: An Inductive Approach," *Proceedings of the 2009 Conference on Artificial Intelligence in Education*. 25-32 (Jul. 20, 2009).

Ketelhut, D., et al. ,"A Multi-User Virtual Environment for Building and Assessing Higher Order Inquiry Skills in Science," *British Journal of Educational Technology*, 41(1): 56-68. Article first published online Dec. 20, 2009.

Sao Pedro, M., et al., "Incorporating Scaffolding and Tutor Context into Bayesian Knowledge Tracing to Predict Inquiry Skill Acquisition," S.K. D'Mello, R.A. Calvo, & A. Olney (Eds.) *Proceedings of the 6th International Conference on Educational Data Mining*, (pp. 185-192), Memphis, TN. Available in conference proceedings on Jul. 6, 2013.

Sao Pedro, M., et al. , "What Different Kinds of Stratification Can Reveal about the Generalizability of Data-Mined Skill Assessment Models," *Proceedings of the 3rd Conference on Learning Analytics and Knowledge*. Leuven, Belgium, Apr. 8, 2013.

Kim, Y. and Lim, J.H., "Gendered Socialization with an Embodied Agent: Creating a Social and Affable Mathematics Learning Envi-

(56) References Cited

OTHER PUBLICATIONS ronment for Middle-Grade Females," *ITLS Faculty Publications* (Nov. 1, 2012): 1-34. Available at: http://works.bepress.com/yanghee_kim/10.

Metacog 101 Introduction, http://www.slideshare.net/metacog/metacog-intro, downloaded Jul. 24, 2015.

Representational state transfer, Wikipedia, https://en.wikipedia.org/wiki/Representational_state_transfer, Jan. 2015.

A Spinoff Is Born: Victory Big Data, http://www.victoryprd.com/portfolio/metacog/, downloaded Jul. 24, 2015.

A Spinoff Is Born: Victory Big Data Whitepaper, http://www.victoryprd.com/demos/5455/metacog_whitepaper_2014-04-18.pdf, Metacog—Delivering insight into how learners tackle challenges (i.e., Show Your Work) Mar. 2014.

Unlock the power of Next Generation PhET® Simulations, http://phet.metacog.com/, downloaded Aug. 6, 2015.

PhET® Interactive Simulations and Metacog Announce Partnership to Offer Next Generation Simulations with Advanced Scoring Analytics API, http://www.prnewswire.com/news-releases/phet-interactive-simulations-and-metacog-announce-partnership-to-offer-next-generation-simulations-with-advanced-scoring-analytics-api-300116029.html, Jul. 21, 2015.

Victory-Metacog School Partnerships, http://victoryschools.metacog.com/, downloaded Jul. 24, 2015.

Metacog, Overview, https://developer.metacog.com/#plans, downloaded Jul. 24, 2015.

Metacog, Architecture Overview, https://developer.metacog.com/architecture, downloaded Aug. 6, 2015.

International Preliminary Report on Patentability for International Application No. PCT/US2014/013615, entitled "Inquiry Skills Tutoring System," dated Aug. 4, 2015.

Mäeots, Mario, et al., "Transforming Students' Inquiry Skills with Computer-Based Simulations," Advanced Learning Technologies, 2008. ICALT '08. Eighth IEEE International Conference on Year: 2008, pp. 938-942, DOI: 10.1109/ICALT.2008.239 IEEE Conference Publications.

Perry, Vannetia R. and Richardson, Clinton P., "The New Mexico Tech Master of Science Teaching Program: An Exemplary Model of Inquiry-Based Learning," Frontiers in Education Conference, 2001, 31st Annual Year: 2001, vol. 1, pp. T3E-1-T3E-4 vol. 1, DOI: 10.1109/FIE.2001.963917 IEEE Conference Publications.

Kukreti, Anant R., et al., "Bridges With Engineering to Teach Authentic Inquiry-Based Mathematics and Science Courses to Middle and High School Students," Frontiers in Education, 2003, FIE 200333rd Annual Year: 2003, vol. 2 pp. F1A-14-F1A-30 vol. 2, DOI: 10.1109/FIE.2003.1264658 IEEE.

Gado, I. and van't Hooft, M, "Determinants of and Dilemmas Related to Inquiry-Based Science Activities Using Handheld Computers and Probeware in Benin, West Africa," Advanced Learning Technologies, 2005, ICALT 2005, Fifth IEEE International Conference on Year: 2005, pp. 338-340, DOI: 10.1109/ICALT.2005.115 IEEE Conference Publications.

Bachtlar, Fitra A., et al., "Fuzzy Inference System Based on a Model of Affective-Cognitive Criteria," Advanced Applied Informatics (IIAI-AAI), 2015 IIAI 4th International Congress on Year: 2015, pp. 343-348, DOI: 10.1109/IIAI-AAI.2015.283 IEEE Conference Publications.

Romero, Ricardo, et al., "A Quantitative Study of the Impact of Automated Facilitation on Engineering Student Dyadic Task Completion," 2011 Frontiers in Education Conference (FIE) Year: 2011, pp. F2C-1-F2C-6, DOI: 10.1109/FIE.2011.6142865 IEEE Conference Publications.

Pimentel, E. P., et al., "Towards a Model for Organizing and Measuring Knowledge Upgrade in Education with Data Mining," IRI-2005 IEEE International Conference on Information Reuse and Integration, Conf., 2005. Year 2005, pp. 56-60, DOI: 10.1109/IRI-05.2005.1506449 IEEE Conference Publications.

\* cited by examiner

ANALYZE DATA —324

GOAL Determine how the amount of ice affects the ice's melting point. —325

MY HYPOTHESIS If I change the amount of ice so that it increases, the boiling point or water will not change —326

MY ANALYSIS —318

CLAIM  When I changed [▼] so that it [▼], the [▼] This means my data [▼] my hypothesis.

EVIDENCE  These trials are evidence of my claim: #3, #4, #5

| Trial Number | Container Size | Heat Amount | Ice Amount (grams) | Melting Point (°C) | Boiling Point (°C) | Melting Time (min) | Boiling Time (min) | Select |
|---|---|---|---|---|---|---|---|---|
| 5 | Large | Low | 100 | 0 | 100 | 5 | 35 | |
| 4 | Large | Low | 200 | 0 | 100 | 10 | 68.75 | |
| 3 | Large | Low | 300 | 0 | 100 | 16.25 | 102.5 | |
| 2 | Medium | Medium | 300 | 0 | 100 | 7.5 | 47.5 | |
| 1 | Medium | Low | 100 | 0 | 100 | 5.5 | 35 | |

I'm Done Analyzing Data ≫

Next, Communicate Findings

INQUIRY SKILLS TUTORING SYSTEM

RELATED APPLICATIONS

This application is a continuation of U.S. application Ser. No. 15/159,539, filed May 19, 2016, which is a continuation of U.S. application Ser. No. 14/167,215, filed Jan. 29, 2014, now U.S. Pat. No. 9,373,082, issued Jun. 21, 2016, which claims the benefit of U.S. Provisional Application No. 61/759,668, filed on Feb. 1, 2013. The entire teachings of the above applications are incorporated herein by reference.

GOVERNMENT SUPPORT

This invention was supported, in whole or in part, by contract NSF-DRL #1008649 from National Science Foundation. The government has certain rights in the invention.

BACKGROUND

Current course management systems, such as assessment systems or leaning environments, are designed for well-defined domains, i.e. those for which there are well-known, well-defined solutions to problems. For example, current systems assess students using multiple choice questions (e.g., Moodle), or simple equations (e.g., mathematics software such as the ASSISTments System developed by Neil Heffernan at Worcester Polytechnic Institute WPI). Learning systems are lacking in areas addressing ill-defined domains, where solutions are not well-defined (e.g., design, abstract problem solving, or conducting science experiments).

SUMMARY OF THE INVENTION

Embodiments of the present invention address the above shortcomings of the art. Inquiry tutoring systems and methods focus on assessing, tracking, and supporting one or more students' scientific inquiry skills as they conduct inquiry in real-time within simulations and/or microworlds. The inquiry tutoring system leverages a pedagogical agent and/or help system capable of assessing what a student is doing as the student (or to any user, learner, or person that is engaged in any form of education or learning) conducts experiments and/or investigations, and may determine when and whether a student needs help. The agent is further configured to respond to the student in real-time to provide hints and guidance about how to better conduct inquiry.

In one embodiment, a method, system, or program product comprises, in a processor, defining one or more measurable science inquiry skills or practices. The method, system, or program product may further include, in a computer, measuring the one or more science inquiry skills of a subject person, the measuring being in real-time and using at least one of an assessment model and a tracking model (an assessment model and/or a tracking model) programmed to infer (evaluate, assess, derive, measure, characterize) science inquiry skill demonstration from interactive engagement by the subject person with a simulation and/or microworld environment comprised of the simulation and/or microworld and, optionally, other interfaces to elicit the subject person's scientific inquiry. The measuring of the one or more science inquiry skills of a subject person may be performed by an assessment model and/or a tracking model. The method, system, or program product may further provide to the subject person real-time feedback through the simulation environment, the real-time feedback being based on the assessment model, the tracking model, or both; and providing to the subject person guidance on how to better conduct scientific inquiry.

In another embodiment, the assessment model and/or tracking model evaluates and estimates proficiency at science inquiry of the subject person using different data-mining based algorithms. In another embodiment, the assessment model and/or tracking model evaluates and estimates proficiency at science inquiry of the subject person using different knowledge-engineering based algorithms. In another embodiment, the assessment model and/or tracking model evaluates and estimates proficiency at science inquiry of the subject person using a combination of different knowledge-engineering based algorithms and data-mining based algorithms.

In another embodiment, the measuring of one or more science inquiry skills provides a performance assessment of at least one or more aggregate science inquiry skills.

In another embodiment, the tracking model tracks the subject person's development of the one or more science inquiry skills over time and across one or more science topics or science domains, wherein the tracking utilizes one or more data-mining based models. In yet another embodiment, the tracking uses the one or more data-mining based models to aggregate information about the subject person and to provide at least one measurement or evaluation of the proficiency for the subject person in one or more science inquiry skills.

In another embodiment, the tracking model tracks the subject person's development of the one or more science inquiry skills over time and across one or more science topics or science domains, wherein the tracking utilizes one or more knowledge-engineering based models. In yet another embodiment, the tracking uses the one or more knowledge-engineering based models to aggregate information about the subject person and to provide at least one measurement or evaluation of the proficiency for the subject person in one or more science inquiry skills.

In another embodiment, the tracking model tracks the subject person's development of the one or more science inquiry skills over time and across one or more science topics or science domains, wherein the tracking utilizes both one or more data-mining based models and knowledge-engineering based models. In yet another embodiment, the tracking uses the one or more data-mining based models and knowledge-engineering based models to aggregate information about the subject person and to provide at least one measurement or evaluation of the proficiency for the subject person in one or more science inquiry skills.

In another embodiment, the real-time feedback is based on at least one of: a knowledge-engineering based assessment model, a data-mining based assessment model, a knowledge-engineering based tracking model, and a data-mining based tracking model.

In another embodiment, the simulated scientific inquiry includes at least one of: generating hypotheses, collecting data, interpreting the collected data, warranting claims with data, and communicating respective findings. In another embodiment, providing real-time feedback through the simulation environment includes providing multi-level feedback regarding at least one of orienting, organizational, procedural, conceptual, and instrumental aspects of the scientific inquiry. In yet another embodiment, the real-time assessment and feedback may be generated based on a student's eye-tracking patterns during the various phases of inquiry including the observation of data/phenomena. An embodiment may employ eye-tracking methods such as an Instruction System With Eyetracking-based Adaptive Scaffolding, in U.S. patent application Ser. No. 13/774,981, or other methods to detect whether a subject person is actively observing data/phenomena in the simulated scientific inquiry.

In another embodiment, the subject person includes one or more students.

In another embodiment, skills include at least at least one of or any subskill of a data collection skill, a data interpretation skill, a hypothesis skill, a claim warranting skill, a communicating findings skill, an identification of an independent variable skill, an identification of a dependent variable skill, a defining of a relationship between variables skill, a designing a controlled experiment skill, a testing a stated hypothesis skill, a warranting an interpretation skill, and a relating an interpretation to a hypothesis skill.

The inquiry tutoring approach differs from current systems and provides several advantages. First, some embodiments focus specifically on assessment of inquiry subskills, culled from more general inquiry skills defined in national and state frameworks. The system measures these skills/subskills within simulation and/or microworld environments, which thus act as performance assessment of inquiry skills. Second, the system assesses and scaffolds inquiry skills in real-time as students conduct their investigations. As described in more detail below, the inquiry tutoring system assesses defined inquiry skills/subskills using data mining-based and/or knowledge-engineering-based models. The system also tracks the development of specific inquiry skills/subskills using data mining-based models and/or knowledge-engineering-based models. The system also employs a pedagogical agent and/or help system to provide feedback to students driven by the data mining-based and/or knowledge-engineering-based assessment and tracking models.

A computer-implemented method for inquiry tutoring may include defining one or more measurable science inquiry skills/subskills comprising general science inquiry skills. For example, general science inquiry skills may include hypothesizing, experimenting, interpreting data, warranting claims, and communicating findings. Subskills may include, for example, but are not limited to, identifying an independent variable, identifying a dependent variable, defining a relationship between one or more variables, designing a controlled experiment, testing a stated hypothesis, warranting an interpretation, relating an interpretation to a hypothesis, communicating findings, and/or the like. In one embodiment, the inquiry tutoring method may include measuring the one or more inquiry skills/subskills in a subject person. Measuring skills/subskills may occur in real-time and use an assessment engine programmed to infer (derive, measure, evaluate) inquiry skill/subskill demonstrations from interactive engagement by the subject person with a simulation environment designed for scientific inquiry.

In other embodiments, the general science inquiry skills may be science practices, general inquiry skills, or the like. Such skills include, but are not limited to the following: (a) asking questions, (b) developing working models, (c) planning and carrying out investigations, (d) analyzing and interpreting data, (e) using mathematical and computational thinking, (f) constructing explanations, (g) engaging in argument from evidence, (h) obtaining, evaluating, and communicating information.

In other embodiments, the general science inquiry skills may be engineering design practices, general engineering skills, or the like. Such skills include designing models for engineering, including but not limited to environmental engineering, industrial engineering, biomechanical engineering, mechanical engineering, chemical engineering, software engineering, computer engineering, electrical engineering, or other types of engineering. General science skills may also include engineering skills, such as engineering design practices. Subskills here may include specifying a parameter for a design and testing the viability of that parameter using a controlled experiment, then interpreting the viability of that parameter for the design.

Embodiments may provide to the subject person real-time feedback through a simulation and/or microworld environment, wherein real-time feedback is based on output from an assessment engine, a tracking engine, or both. The inquiry tutoring method may also provide feedback through guidance on how to better conduct scientific inquiry. In one embodiment, an assessment engine estimates proficiency of the subject person using different data-mining based algorithms. A data mining algorithm may include formulating data retrieval and organizing the retrieved data. In one embodiment, an assessment engine may include knowledge-engineered rules assessing performance of one or more science inquiry skills/subskills. In another embodiment the assessment engine may also include data-mined rules to assess performance of one or more ill-defined (domains in which there are multiple correct solutions or paths) or well-defined (domains for which there are well-known, well-defined solutions to problems) science inquiry skills/subskills. In yet another embodiment, the assessment engine may include both knowledge-engineered rules and data-mined rules. In one embodiment, the measuring of science inquiry skills/subskills provides a performance assessment of science inquiry skills.

The inquiry tutoring method may also include tracking the subject person's development of the science inquiry skills/subskills over time and across shared science domains. In one embodiment, tracking utilizes one or more data mining-based models. Tracking may use data-mining-based models to aggregate information about the subject person and to provide estimates of whether the subject person knows the science inquiry skills or not. In one embodiment, tracking utilizes one or more knowledge-engineering-based models. In another embodiment, tracking utilizes one or more data-mining-based models and/or knowledge-engineering-based models.

In yet another embodiment, the inquiry tutoring method may include both an assessment engine and a tracking engine. In one embodiment, the assessment engine and the tracking engine may include knowledge-engineered based models. In another embodiment the assessment engine and the tracking engine may also include data-mined rules to assess and track performance of one or more ill-defined science inquiry subskills. In yet another embodiment, the assessment engine and the tracking engine may include both knowledge-engineered rules and data-mined rules.

The inquiry tutoring methods may include a simulated scientific inquiry. The simulated scientific inquiry may include the subject person generating hypotheses, collecting data to test the hypotheses, interpreting the collected data, warranting claims with data, and communicating his findings. In another embodiment, providing real-time feedback through the simulation environment includes providing multi-level feedback including, but not limited to, procedural, instrumental, orienting, organizational, and conceptual aspects of the scientific inquiry. The subject person using the inquiry tutoring method may include one or more users, e.g., one or more students, apprentices, trainees, groups, teams, and/or the like. In addition, the science inquiry subskills may include at least, for example, a hypothesizing skill, an experiment design skill, a data collection skill, a data interpretation skill, a claim warranting skill, and a communicating findings skill.

Another embodiment of the present invention may include a system, including a processing module configured to define one or more measurable science inquiry subskills forming general science inquiry skills. The system may also include a computing module configured to measure, in real-time, the one or more science inquiry subskills of a subject person and use an assessment model and/or a tracking model programmed to evaluate, measure, determine and/or track science inquiry skill/subskill demonstration from interactive engagement by the subject person with a simulation environment for scientific inquiry. The system may also include a user interface module configured to provide to the subject person real-time feedback through the simulation environment, the real-time feedback being based on the assessment model. In one embodiment, an assessment model may assess the subject using at least one of a data-mining and/or knowledge-engineering based model. In another embodiment, a tracking model may track the subject using at least one of a data-mining and/or knowledge-engineering based model. In another embodiment, an assessment model may assess and the tracking model may track the subject using data-mining or knowledge-engineering based models. In addition, the user interface module may be further configured to provide guidance to the subject person on how to better conduct scientific inquiry.

In another embodiment of the system of the present invention, the assessment model and/or the tracking model may estimate and track proficiency of science inquiry of the subject person using different data mining-based or knowledge-engineering-based algorithms. The assessment models and/or the tracking models may be formed from knowledge-engineered rules assessing performance of one or more well-defined science inquiry skills/subskills, and the assessment and/or tracking models may be formed from data-mined rules to assess performance of one or more ill-defined science inquiry skills/subskills. In the system, the computing module may provide a performance assessment of the one or more science inquiry skills by measuring one or more science inquiry skills. In the system, the assessment models and/or tracking model may further perform tracking of the subject person's development of the one or more science inquiry skills/subskills over time and across shared science domains, wherein the tracking utilizes one or more data mining-based models.

In another embodiment of the system of the present invention, the assessment model and/or the tracking model use the one or more data mining-based models to aggregate information about the subject person and to provide estimates of whether the subject person knows the one or more science inquiry skills or not, and the real-time feedback is further based on the one or more data mining-based models and/or knowledge-engineering-based models from the tracking. In the system, the simulated scientific inquiry includes the subject person generating hypotheses, collecting data to test the hypotheses, interpreting the collected data, warranting claims with data, and the subject person communicates respective findings. In the system, the user interface module is further configured to provide real-time feedback through the simulation environment by providing multi-level feedback regarding orienting, organizational, procedural, conceptual, and instrumental aspects of the scientific inquiry such as, for example, a hypothesizing skill, an experiment design skill, a data collection skill, a data interpretation skill, a claim warranting skill, and a communicating findings skill.

Another embodiment of the present invention may include a computer program product providing a tutoring agent. The computer program product may include a non-transitory computer useable medium having a computer readable program. The computer readable program when executed on a computer may cause the computer to define one or more measurable science inquiry subskills underlying general science inquiry skills. The program may also measure the one or more science inquiry subskills of a subject person, the measuring being in real-time and using an assessment model programmed to infer, by which we mean evaluate, measure, etc. science inquiry subskill demonstration from interactive engagement by the subject person with a simulation environment for scientific inquiry. The program may also perform tracking of the subject person's development of the one or more science inquiry subskills over time and across shared science domains. The program may also provide to the subject person real-time feedback through the simulation environment, the real-time feedback being based on the assessment models. In addition, the program may provide to the subject person guidance on how to better conduct scientific inquiry.

In accordance with the above, in an example embodiment, the present methods, systems, and apparatuses comprise defining one or more measurable science inquiry subskills forming general science inquiry skills. A computer then measuring the one or more inquiry subskills of a subject person, said measuring being in-real time and using assessment models programmed to infer inquiry subskill demonstration from interactive engagement by the subject person with a simulation environment for scientific inquiry. The methods, systems, and apparatuses then provide to the subject person real-time feedback being based on the assessment models, and provide to the subject person guidance on how to better conduct scientific inquiry.

BRIEF DESCRIPTION OF THE DRAWINGS

The foregoing will be apparent from the following more particular description of embodiments, as illustrated in the accompanying drawings. The drawings are not necessarily to scale, emphasis instead being placed upon illustrating embodiments.

FIGS. 4A-4E are screenviews of example embodiments of a simulated user interface of the present invention.

DETAILED DESCRIPTION OF THE INVENTION

A description of embodiments follows. The teachings of all patents, published applications and references cited herein are incorporated by reference in their entirety.

As used herein, "infer" and "inferring" may include, but are not limited to evaluating, assessing, deriving, measuring, characterizing a value or a set of values.

As used herein, "well-defined" may include, but are not limited to domains for which there are well-known, well-defined solutions to problems.

As used herein, "μl-defined" may include, but are not limited to domains for there are multiple correct solutions or paths.

As used herein, "student" may include, but are not limited to any user, learner, or person that is engaged in any form of education or learning.

As used herein, an "estimate" may include, but is not limited to measurements based on metrics or indices obtained by the present methods and systems.

Inquiry skills may provide an indication of a user's proficiency with a technical area. Current systems do not adequately capture a user's ability to inquire because of the reliance on hand-scoring of data and/or on multiple choice tests that do not represent and measure proficiencies of science inquiry skills. The inquiry tutoring system of the present invention defines a general set of skills and a specific set of skills. The inquiry tutoring system further defines, captures, and maintains a set of educational log data for collection from one or more simulation environments. Based on the data collected, the inquiry tutoring system determines whether the educational log data indicates a skill having reached a level of proficiency. From the proficiency determination, the inquiry tutoring system may provide real-time feedback through a help system associated with the simulation environment, wherein real-time feedback is based on output from assessment and/or tracking engine or models. In one embodiment, the help system may be a pedagogical agent.

Figure 1:
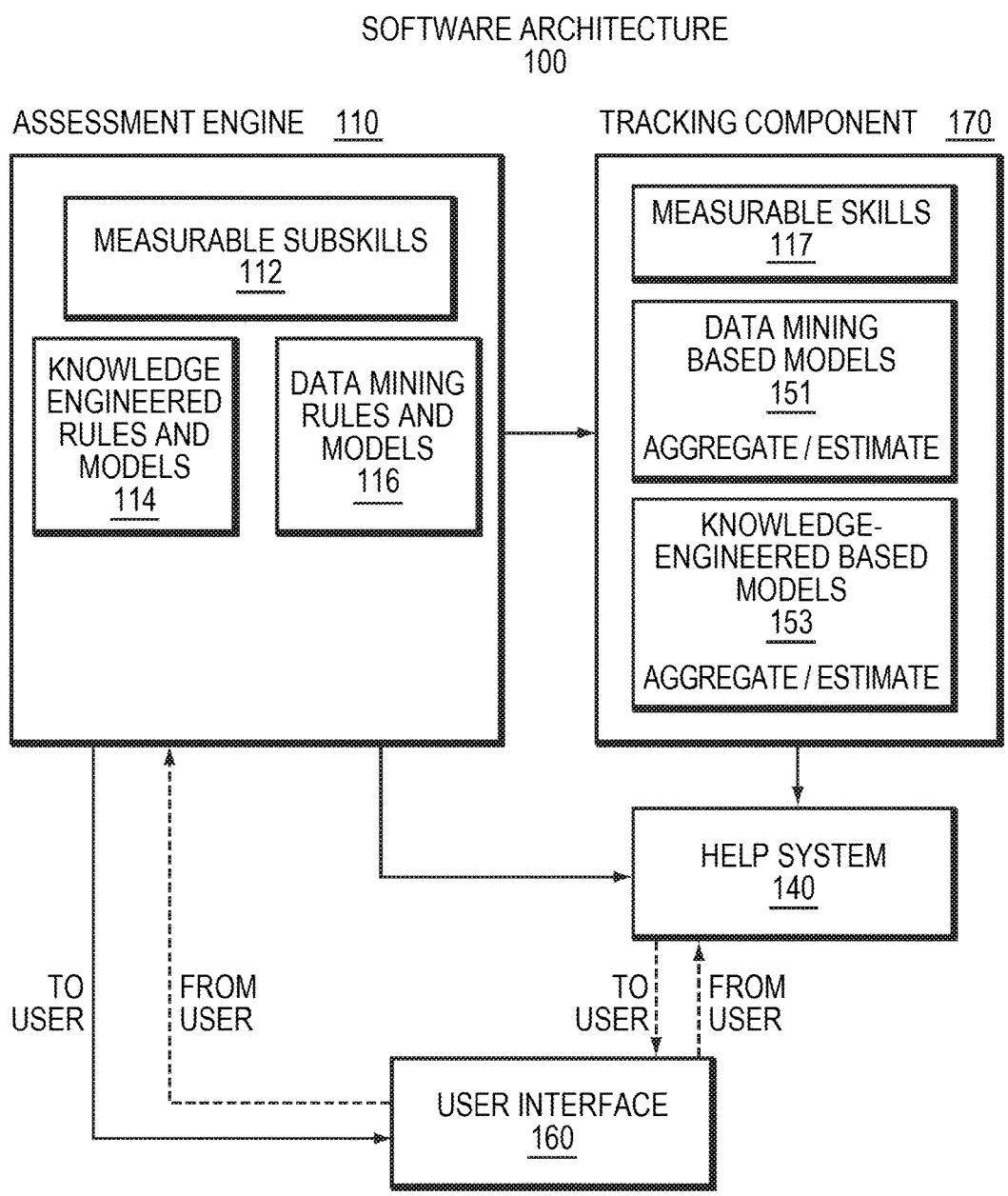
FIG. 1 is a block diagram illustrating an example embodiment of a software architecture of the present invention.

FIG. 1 is a block diagram illustrating an example embodiment of the present invention having a software architecture 100. The software architecture may include an assessment engine 110, a tracking component 170, a help system 140, and a user interface 160.

The assessment engine 110 may include measurable skills 112, knowledge engineered rules and models 114, and data mined rules and models 116. Measurable skills 112 may be culled from a more general or a specific set of inquiry skills defined in a framework, including, but not limited to, a national or state framework. For example, general inquiry skills may include, but are not limited to, generating hypotheses, collecting data to test the hypotheses, interpreting the collected data, warranting claims with data, or communicating respective findings. Specific inquiry skills may include, for example, identifying an independent variable, identifying a dependent variable, defining a relationship between a variable, designing a controlled experiment, testing a stated hypothesis, warranting an interpretation, relating an interpretation to a hypothesis, and/or the like. Specific inquiry skills may be referred to as sub skills. In one embodiment, the assessment engine 110 is in communication with the tracking component 170, the help system 140, and the user interface 160 over a network. The help system 140 may be a pedagogical agent. The assessment engine 110 may include components communicating with or among other components residing on or with other engines or agents.

The assessment engine 110 may include a knowledge-engineered rule base 114. The knowledge-engineered rule base 114 may include a hypothesis rule base, an experiment rule base, an analysis rule base, a warranting claims rule base, and/or the like. The assessment engine 110 may include data-mining-based assessment algorithms, rules, and models 116. A data-mining based assessment algorithm may include maintaining data-mining information (e.g., educational log data, summary features of those log data, streaming data, data that lives in computer memory) and assessing the data-mining information. In one embodiment, a data-mining based assessment (at 116) may include a decision tree with cutoff values for specific features. The cutoff values may be used by the assessment engine 110 to infer or predict whether the educational log data indicates that a user demonstrates proficiency in one or more skills. The knowledge engineered rules and models 114 and the data-mining rules and models 116 may assess the performance of one or more well-defined science inquiry skills. The knowledge engineered rules and models 114 and the data-mining rules and models 116 may assess the performance of one or more ill-defined science inquiry skills.

The help system 140 may be in communication with user interface 160 or through one or more engines or components, e.g., the assessment engine 110 and/or tracking component 170 as illustrated in FIG. 1. In one embodiment, the pedagogical agent and/or help system 140 may include a computer-based character providing feedback to users in the form of messages, such as, text, graphics, and multimedia. For example, the agent may respond, through one or more messages, in real-time, as users are interacting with the user interface 160, simulation environment, and/or the like. The messages from the help system 140 may be driven by the assessment engine 110, through knowledge-engineered 114 and/or data-mined 116 assessment rules and models. In one embodiment, the pedagogical agent and/or help system 140 may provide feedback based on tracked user performance, user performance across different science domains, and/or user performance over time. This is accomplished through data-mining based models 151 and/or knowledge-engineered based models 153 described below. The assessment may also be real-time, where the help system 140 processes historical and/or real time educational log data with real-time input, (e.g., responses from a user to messages from the pedagogical agent and/or help system 140).

As noted above, the pedagogical agent and/or help system 140 may interact with a user as the user conducts an inquiry within one or more simulation environments. As the user is working within the simulation environment, the assessment engine 110 may conduct an assessment for a given skill, e.g., skill A. Based on the assessment, the pedagogical agent and/or help system 140 determines an appropriate feedback message regarding skill A. As the student engages further with the simulation environment, the assessment engine 110 continues to evaluate/assess user proficiency for skill A and continues to conduct assessment of skill A, which may be provided to the help system 140 for determining a feedback message to provide to the student.

The tracking component 170 may include measurable skills 117, data mining based models 151, and knowledge-engineered based models 153. One or more of the models 151, 153 may include one or more aggregate and/or estimate models. "Estimate" may include, but is not limited to measurements based on metrics or indices obtained by the present methods and systems. The models 151, 153 may be searchable by query search or graph search. For example, a query search may include formulating keywords and/or query statements, such as, SELECT, FROM, WHERE. The models 151 and 153 may also be graph searchable by skill, by topic, by student, and by grade. Data mining may be accomplished by combining (aggregating) results from query statements with graph searches. In one embodiment, the tracking component 170 may track user progress over time using Bayesian knowledge tracing. For example, tracking user progress may include storing educational log data for an individual student in a database record. Tracking may also include tracking progress for a class of students, students of a grade level, a school population, a district, a state, and/or a geographical region over time. As a student or user engages in several inquiry activities, the inquiry tutoring system includes data mined-based models 151 and knowledge-engineered based models 153 that aggregate this information and provide estimates of the student's proficiency within the set of inquiry subskills. This information may be syndicated to the pedagogical agent and/or help system 140 to utilize in determining one or more messages to display to the user or may be syndicated to a teacher to provide formative assessment feedback about student progress. In one embodiment, Bayesian knowledge tracing models populate the database record field(s) indicating proficiency estimates at a skill(s) (and thus inquiry skill) per student. Similarly, in response to the pedagogical agent and/or help system 140 sharing a scaffolding message to the student, the assessment engine 110 populates or otherwise indicates pertinent data in the database record of the student. This enables subsequent reporting to a teacher of the student's progress per sub skill.

The user interface 160 may be in communication with the assessment engine 110, tracking component 170 and/or pedagogical agent and/or help system 140. In one embodiment, the user interface 160 may display the simulation environment to the user with the pedagogical agent and/or help system 140 appearing when the help system decides a message should be delivered using assessments generated by the assessment engine 110. In another embodiment, the pedagogical agent and/or help system 140 may appear based on information generated from the tracking component 170.

Figure 2:
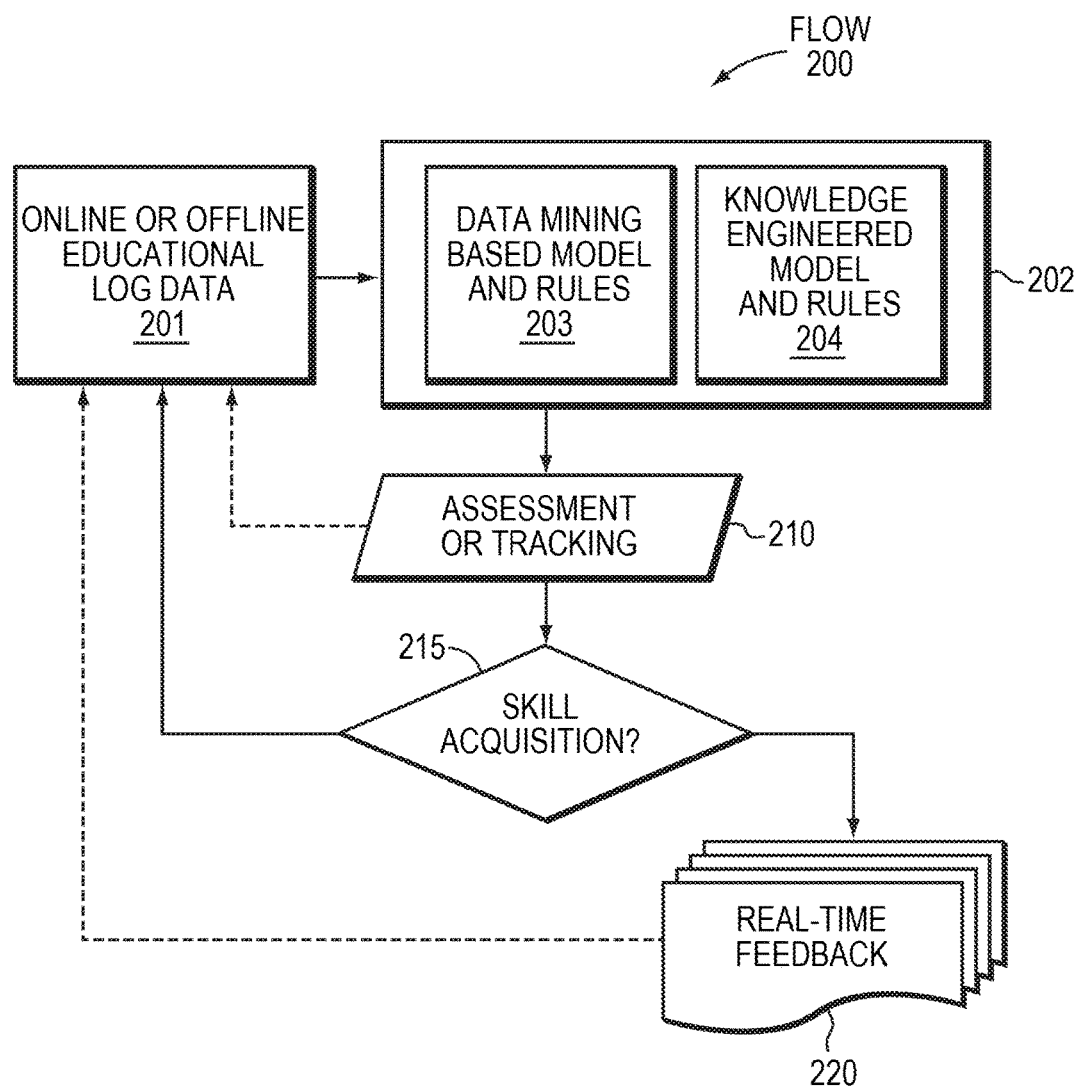
FIG. 2 is a flow diagram illustrating one embodiment of a method, system, or process for inquiry tutoring according to the present invention.

FIG. 2 is a flow diagram illustrating an example embodiment of a process which occurs within the assessment engine 110 and/or the tracking component 170 of FIG. 1. The flow diagram 200 may include receiving educational log data 201. Educational log data 201 may include information logged from one or more simulation environments. The educational log data 201 may be received and stored in an online manner, including but not limited to, receiving online data, or real time processing of students' interaction data. The educational log data 201 may be received and stored in an offline manner, including but not limited to, storing data to a database or a file server. The educational log data 201 may include, but is not limited to, log files, graphical user interactions, or other types of stored data. The educational log data 201 may be aggregated (at 202) through knowledge engineered rules and models 204 and be structured (at 202) according to one or more data mining rules and models 203. In one embodiment, the process 200 may include tracking or conducting an assessment 210, using the data mining models 203, knowledge engineered rules 204 and educational log data 201. The process 200, after tracking or conducting an assessment 210 may send educational log data 201 back through the process 200 to again be aggregated (at 202). As illustrated in process 200, tracking or conducting an assessment 210 may check if a skill or skills have been acquired 215. If the process determines (at 215) that a skill either has or has not been acquired, the process may provide real-time feedback 220. At the same time, the process can send educational log data 201 back through the process to again be aggregated and/or structured (at 202). The real-time feedback 220 may also send educational log data 201 back through the process to again be aggregated and/or structured (at 202), thus starting the process over. In one embodiment, the skill acquisition determination process may also return to receive supplemental educational log data 201. In another embodiment, real-time feedback 220 may be provided both when the student does not acquire the skill (including, but not limited to a specific help message on how to perform an inquiry skill/subskill), and when they do acquire the skill (including, but not limited to an acknowledgement of their successful progress).

Figure 3:
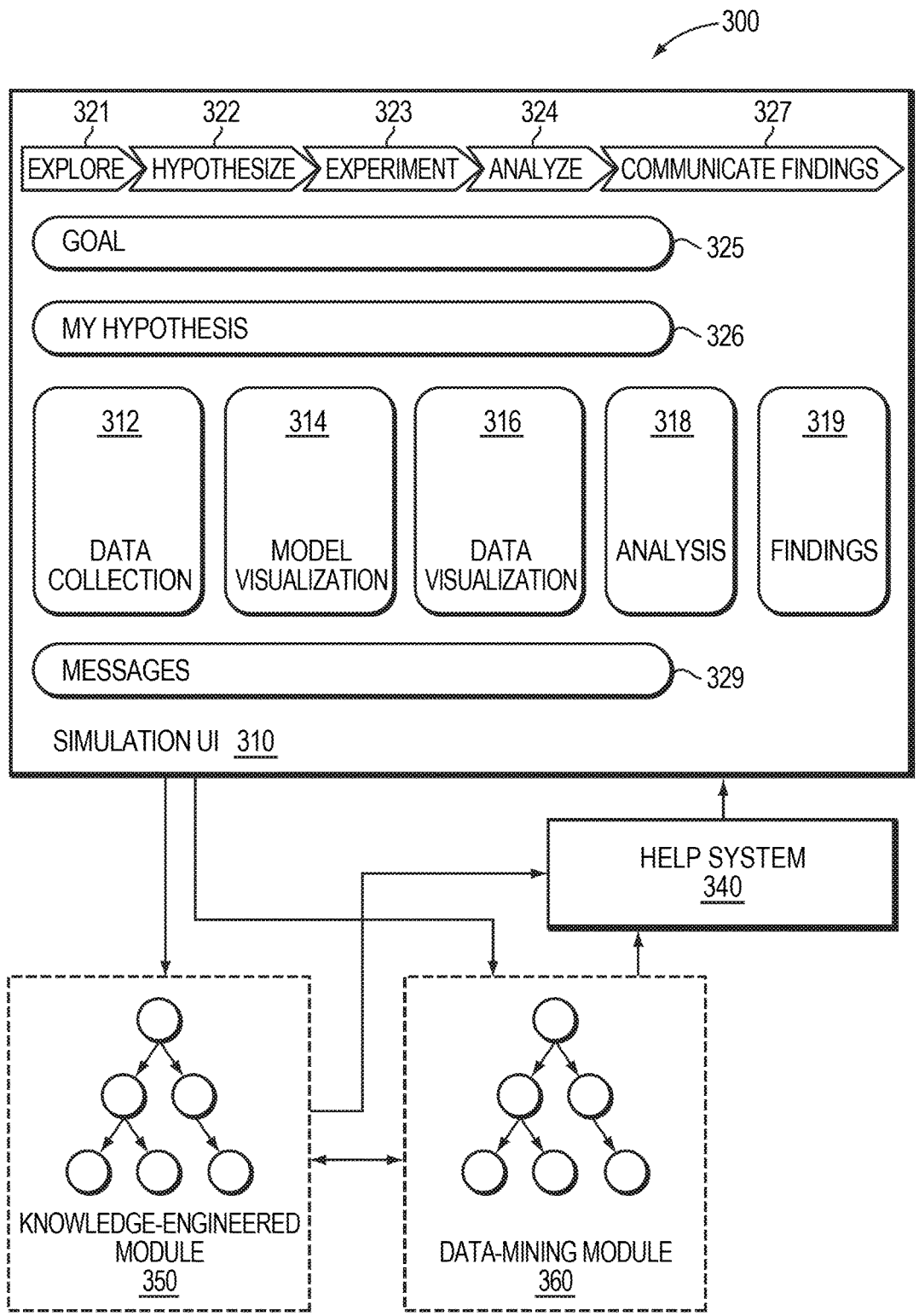
FIG. 3 is a block diagram illustrating one embodiment of an inquiry tutoring method, system, or implementation according to the present invention.

FIG. 3 is a block diagram illustrating an example embodiment of an inquiry tutoring system according to the present invention. The inquiry tutoring system 300 may include a simulation user interface 310, a help system 340, a knowledge engineering based module 350, and data mining based module 360. The simulated user interface 310 is one embodiment of the user interface 160 represented in the software architecture 100 of FIG. 1. The knowledge engineering based module 350 and the data mining based module 360 may be assessment models, tracking models, or both. The help system 340 may be a pedagogical agent. Data generated from the simulation UI 310 may be sent to either the knowledge-engineered module 350 and/or the data mining module 360. The knowledge-engineered module 350 and/or the data mining module 360 may also be in communication with the help system 340. The simulation user interface 310 may include one or more interface elements. These interface elements may include a navigation or phase bar illustrating state or stages of science inquiry. In one embodiment, a phase bar may include an explore phase 321, a hypotheses phase 322, an experiment phase 323, an analyze phase 324, a communicate findings phase 327, and/or other phases. Phases may be added or removed as needed. Within this environment, a user may generate hypotheses, collect data to test hypotheses, interpret data, warrant claims with data, and communicate findings.

As illustrated in FIG. 3, the simulation user interface 310 may also include a goal interface element 325 and a Myhypothesis interface element 326. The goal 325 and/or Myhypothesis interface 326 elements may receive input from one or more users or display output regarding a status within the simulation environment. For example, the goal interface element may display a specific goal the system wants the user to reach. In one embodiment, the Myhypothesis element 326 may allow a user to submit input regarding a hypothesis derived from collecting data and interpreting the data from the explore phase 321. The simulation user-interface 310 may also include a data collection frame 312, a model visualization frame 314, a data visualization frame 316, an analysis frame 318, and a findings (or word processing) frame 319. The model visualization frame 314 may include, but are not limited to, a simulation, a microworld, or an animation, including but not limited to a flash or HTML5/CSS/JavaScript animation. Upon determination from the pedagogical agent and/or help system 340 that the user desires or requires feedback or assistance, one or more messages 329 may be provided. The simulation user-interface 310 may include other types of frames, examples of which are seen in FIGS. 4A-4E.

Figure 4A:
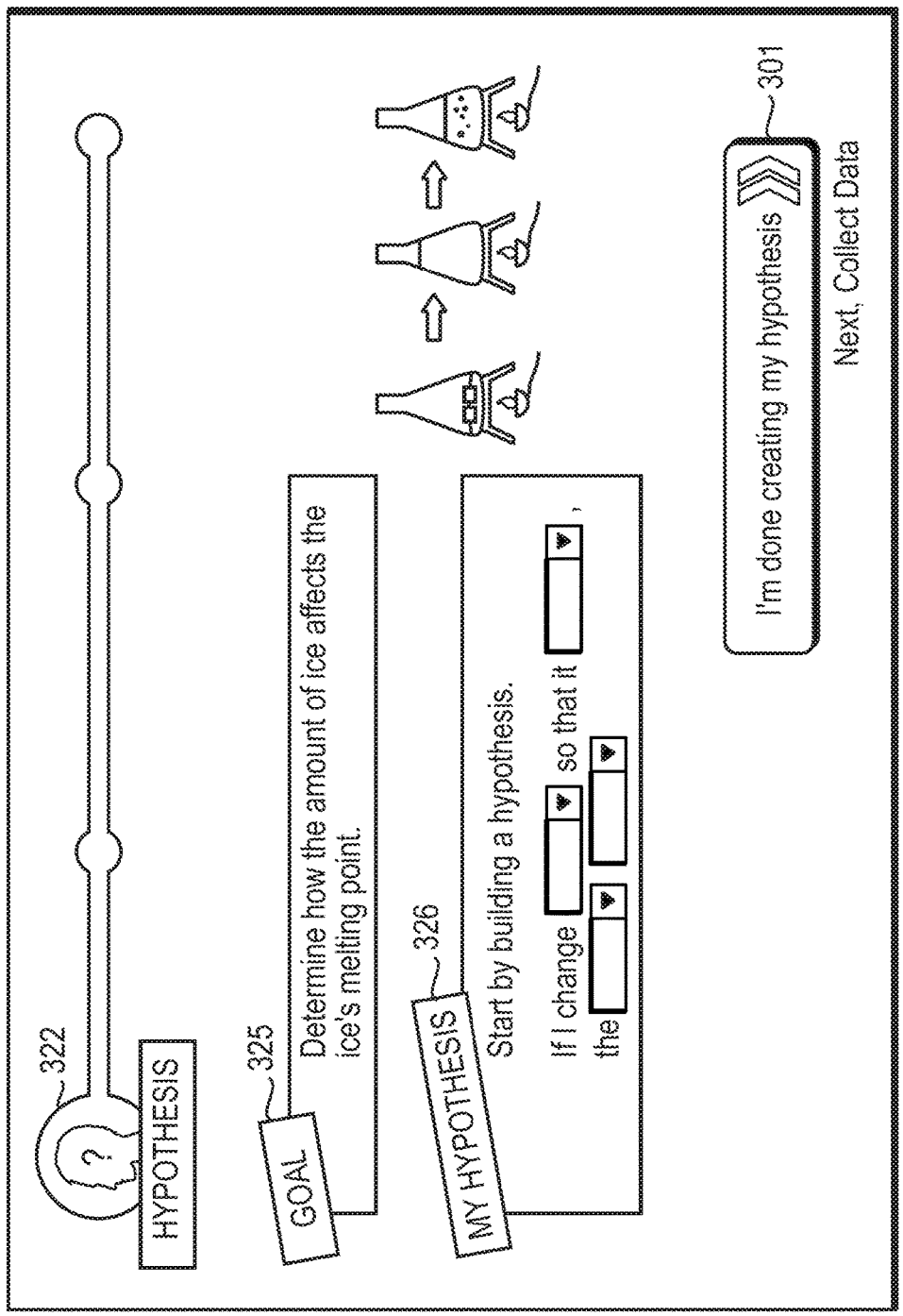

FIGS. 4A-4E are example screenviews of the user-interface 310 from FIG. 3. FIG. 4A is an example embodiment of the user interface in the hypothesis phase 322. The user reads a goal from the goal interface element 325, and may input values into the Myhypothesis interface 326 regarding the possible outcomes of the simulated experiment. The user may then interact with the user interface by pressing the button 301 to continue to the next phase, the experiment phase 323.

Figure 4B:
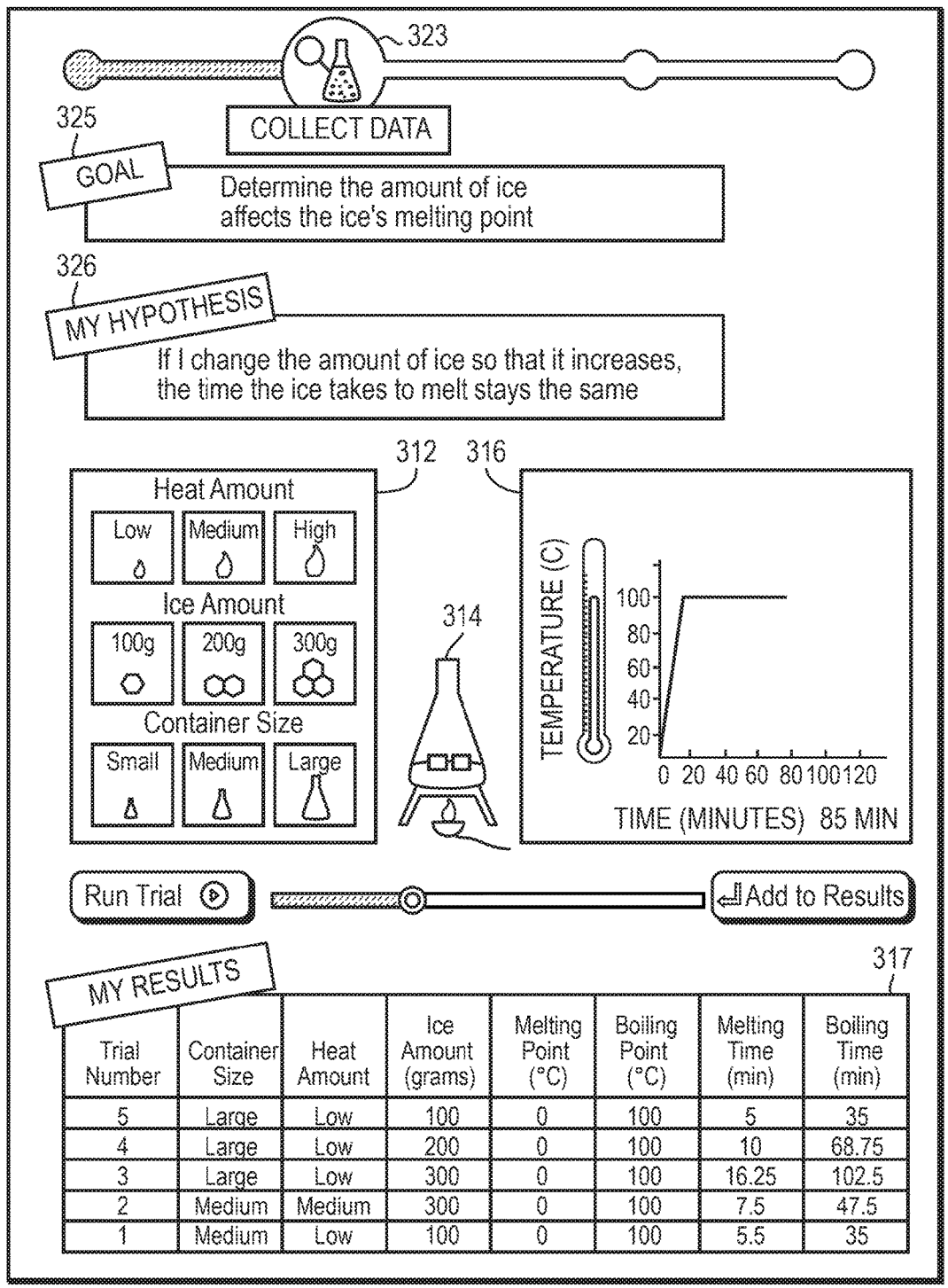

FIG. 4B is an example embodiment of the user interface in experiment phase 323 (called "Collect Data"). The goal interface element 325 remains the same as FIG. 4A. The values input in the Myhypothesis interface 326 are present for the user to see during the experiment. The user may interact with data collection frame 312 by changing the variables in the data collection frame 312, including, but not limited to "Heat Amount," "Ice Amount," and "Container Size." The user may visualize a simulation, model, animation, or microworld in the model visualization frame 314 based on the inputs from the data collection frame 312. The data produced by the experiment is then visualized in the data visualization frame 316. The results may be added to a results frame 317 that the user carries over to the next phase.

FIG. 4C is an example embodiment of the user interface in the analyze phase 324. The goal interface element 325 and Myhypothesis interface 326 remain the same as the prior phase, and remain present for the user to see. The analysis frame 318 may be manipulated by the user to highlight certain data points. This allows the user to interact with the data, reach a conclusion based on the simulated experiment, select which data best serves as evidence to support their conclusion, and determine whether their initial hypothesis was supported.

Figure 4D:
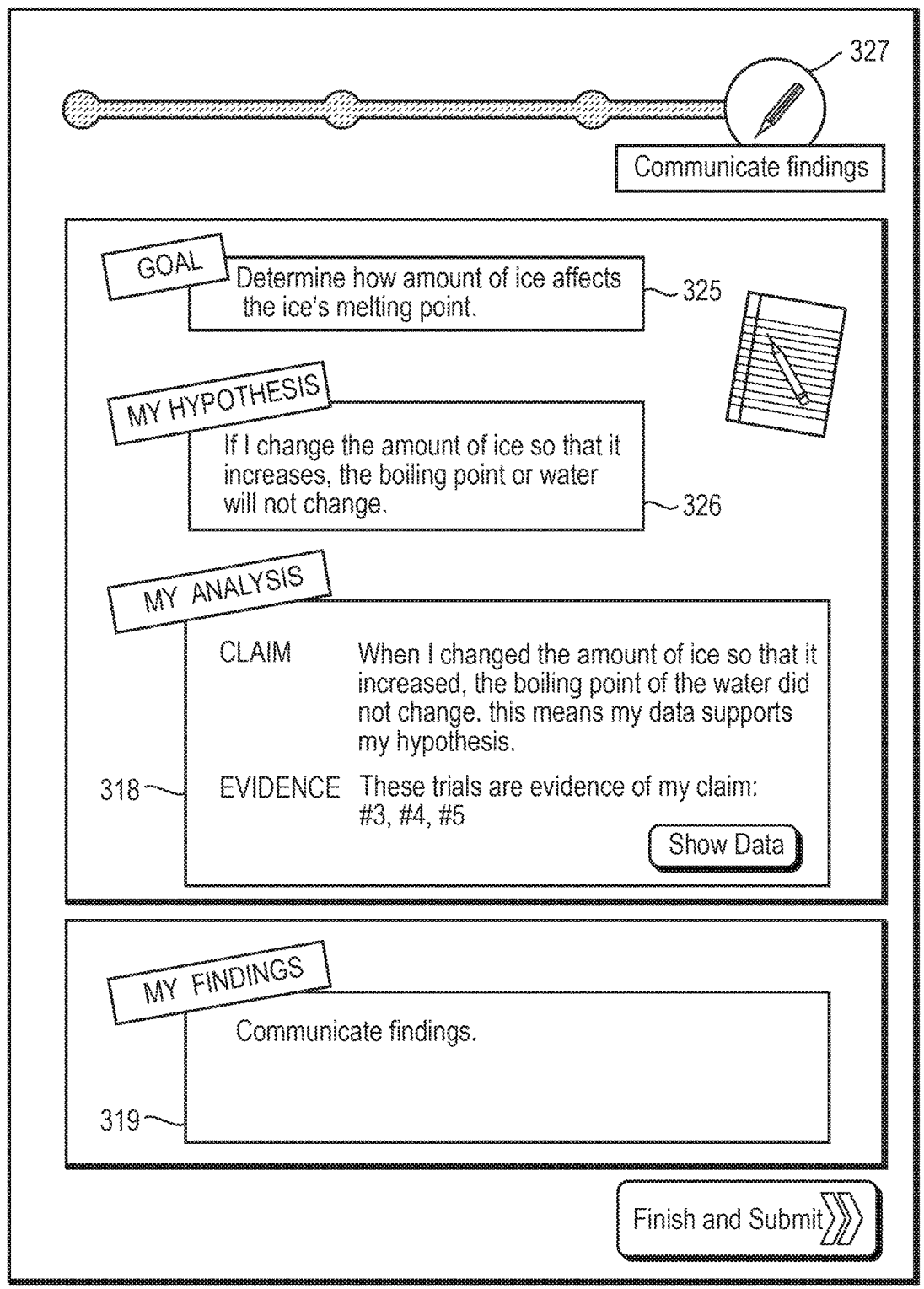

FIG. 4D is an example embodiment of the user interface in the communicate findings phase 327. The goal interface element 325 and Myhypothesis interface 326 remain the same as the prior phase, and remain present for the user to see. The analysis frame 318, with the inputs from the previous phase, is also present for the user to see. In this example, the user may interact with a word-processing frame 319 to allow the user to create a written description of the experiments and results that the user obtained during the simulation.

Figure 4E:
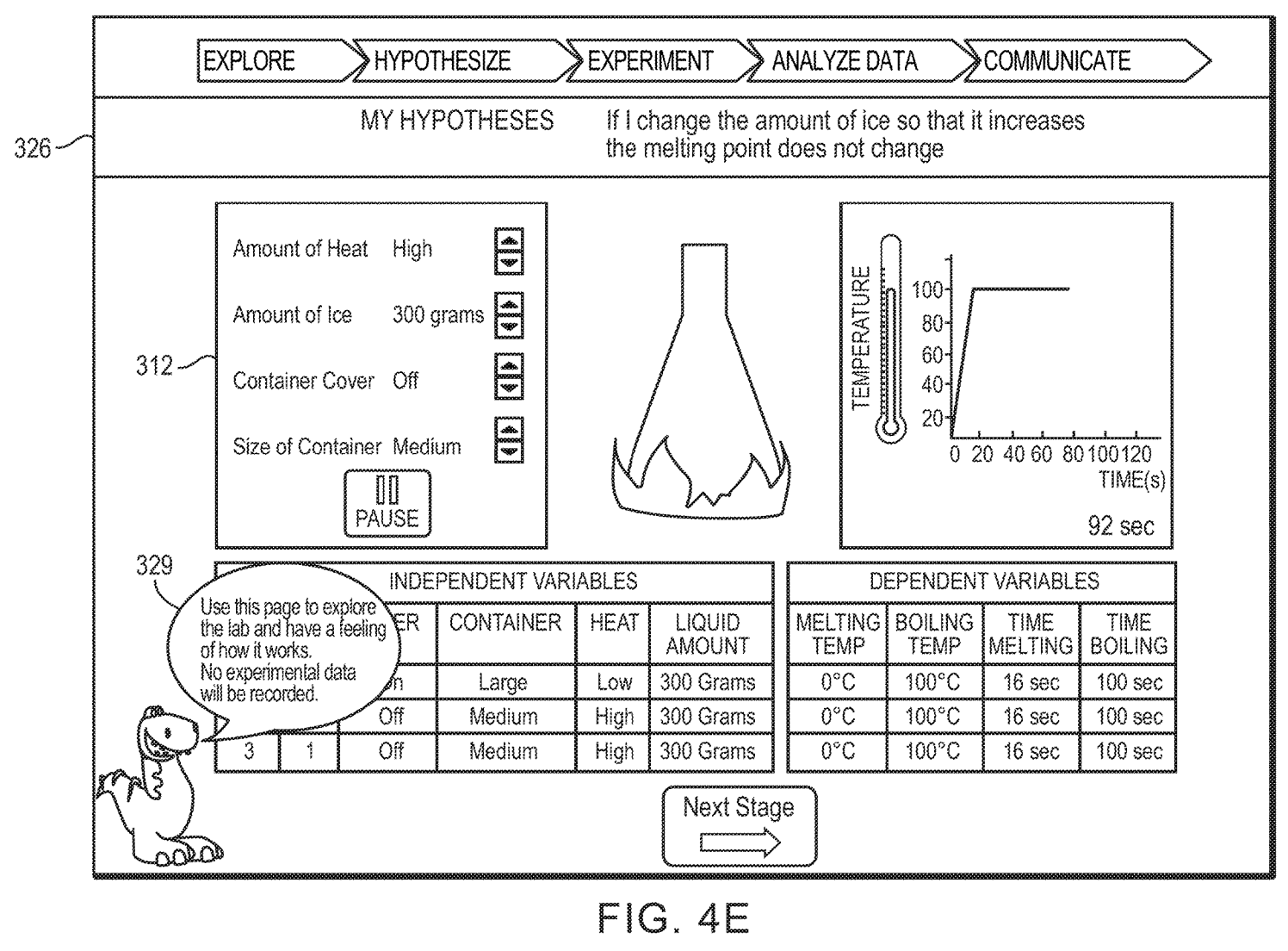

FIG. 4E is an example embodiment of the user interface displaying a message provided by the pedagogical agent and/or help system 340. This screenview is analogous to the data collection frame 312 of FIG. 4B. In this example embodiment, the user may still interact with the data collection frame 312 and view the Myhypothesis interface 326 established earlier. Upon determination from the pedagogical agent and/or help system 340 that the user desires or requires feedback or assistance, a message 329 may be provided.

Referring back to FIG. 3, assessment for simulation-based inquiry learning may include models developed through (1) knowledge engineering and/or cognitive task analysis, and (2) models developed through data mining and/or machine learning methods. In knowledge engineering and/or cognitive task analysis approaches, rules 350 are defined a priori and encapsulate specific behaviors or differing levels of systematic experimentation and/or inquiry skill. For example, knowledge engineered rules may include a rule-based Adaptive Control of Thought-Rational (ACT-R) model of scientific inquiry based on an assessment of skill differences between experts and novices on formulating hypotheses, exploring, analyzing data, and generating conclusions. The ACT-R model may be used to model overt, observable human behavior(s). The rule base describes cognition as involving declarative knowledge (i.e., knowledge about things), and procedural knowledge (i.e., skills that act on knowledge); procedural knowledge is implemented in ACT-R models as production rules.

With ACT-R in mind, knowledge-engineering models may be leveraged using a method called model-tracing, where student responses are matched to a knowledge-engineered cognitive model of expert and/or correct behavior that includes declarative knowledge and production rules and, in some cases, specific misconceptions, including, but not limited to bugs or defects. In one embodiment, model tracing may be used with production rules to auto-score students' inquiry on the use of the control-of-variables (CVS) strategy and more broadly on designing controlled experiments, where all but the target variable is changed across trials within a simulation, such as a science microworld. See for example, the following publications that are hereby incorporated by reference: Sao Pedro, M. A., *Real-Time Assessment, Prediction, and Scaffolding of Middle School Students' Data Collection Skills within Physical Science Microworlds*, Social Science and Policy Studies: Learning Sciences and Technologies Program Ph.D. Dissertation, Worcester Polytechnic Institute, (April 2013); Gobert, J. D., Sao Pedro, M. A., Baker, S. J. d., Toto, E., and Montalvo, O., *Leveraging educational data mining for real time performance assessment of scientific inquiry skills within microworlds*, Journal of Educational Data Mining, 4, 1 (2012), 111-143.

Knowledge-engineered models may also be leveraged to track student proficiency at inquiry skills over time and across science topics. For example, a rational model may average students' performance over time at an inquiry skill/subskill as an estimate, i.e., a measure or evaluation of their proficiency. See for example, the following publication that is hereby incorporated by reference: Sao Pedro, M. A., Baker, Ryan S. J. d., Gobert, J. D., Montalvo, O., and Nakama, A. *Leveraging Machine-Learned Detectors of Systematic Inquiry Behavior to Estimate and Predict Transfer of Inquiry Skill*. User Modeling and User-Adapted Interaction (2013), 23(1), 1-39.

With respect to data mining based models 360, educational data mining and/or machine learning approaches may be employed and include discovering student inquiry behaviors from data. For example, a self-organizing artificial neural network may build models of novice and expert performance using transition logs within a given learning environment, for example, a high school chemistry class. These models may be leveraged to construct a hidden Markov model for identifying learner trajectories through a series of activities.

Data mining approaches (at 360) may be used to distinguish students' problem solving strategies within exploratory learning environments. For example, clustering techniques and class association rules may capture learner models of effective and ineffective learning strategies within an exploratory learning environment for learning about a constraint satisfaction algorithm. In one embodiment, a constraint satisfaction algorithm may include identifying a constraint, setting a threshold for satisfying the constraint and/or determining whether the constraint satisfaction has been met. In another embodiment, a decision tree with cutoff values for certain features may be used as an assessment model to evaluate whether a student has demonstrated an inquiry subskill. See for example, the following publications that are hereby incorporated by reference: Sao Pedro, M. A., Baker, Ryan S. J. d., Gobert, J. D., Montalvo, O., and Nakama, A. *Leveraging Machine-Learned Detectors of Systematic Inquiry Behavior to Estimate and Predict Transfer of Inquiry Skill*. User Modeling and User-Adapted Interaction (2013), 23(1), 1-39; Sao Pedro, M. A., *Real-Time Assessment, Prediction, and Scaffolding of Middle School Students' Data Collection Skills within Physical Science Simulations*, Social Science and Policy Studies: Learning Sciences and Technologies Program Ph.D. Dissertation, Worcester Polytechnic Institute, (April 2013). Data mining models 360 may also be used with a task-dependent and/or a task-independent machine-learned model to predict skill proficiency in computer desktop applications.

Data mining approaches (at 360) may also be used to track student inquiry skill and sub skill proficiency development over time and across simulation topics/domains. For example, Model-tracing assessments and other approaches may be, in turn, utilized within knowledge-tracing. In one embodiment, knowledge tracing may include assessing latent knowledge from correct and incorrect performance. Knowledge-tracing models may be implemented as a form of Bayesian Networks and/or Bayes nets (BNs). For example, BNs may assess procedural knowledge for physics within various learning environments. A dynamic BN may model middle school students' narrative, strategic, and curricular knowledge as students explore a three-dimensional (3D) immersive environment on microbiology. In one embodiment, BN's may include or utilize related diagnostic measurement tools to model multivariate skill profiles for network engineering based on performance in an interactive digital learning environment. In another embodiment, data-mined assessment models may be utilized within knowledge-tracing. See for example, the following publications that are hereby incorporated by reference: Sao Pedro, M. A., Baker, Ryan S. J. d., Gobert, J. D., Montalvo, O., and Nakama, A. *Leveraging Machine-Learned Detectors of Systematic Inquiry Behavior to Estimate and Predict Transfer of Inquiry Skill*. User Modeling and User-Adapted Interaction (2013), 23(1), 1-39; Sao Pedro, M. A., Baker, Ryan S. J. d., Gobert, J. D., Incorporating Scaffolding and Tutor Context into Bayesian Knowledge Tracing to Predict Inquiry Skill Acquisition. In S. K. D'Mello, R. A. Calvo, & A. Olney (Eds.) *Proceedings of the 6th International Conference on Educational Data Mining*, (pp. 185-192). Memphis, Tenn.

Figure 5:
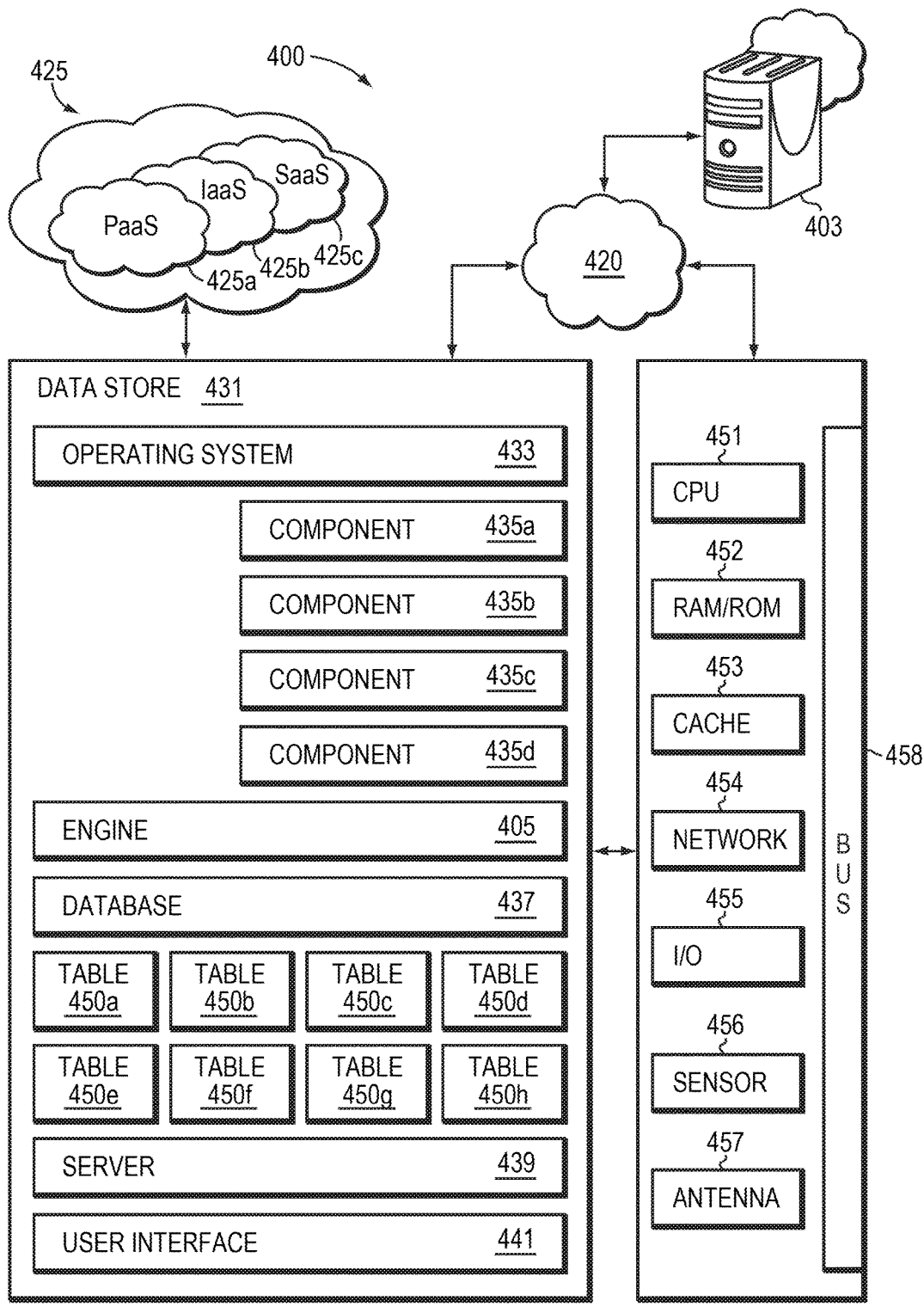
FIG. 5 is a block diagram of a computer system for inquiry tutoring according to one embodiment of the present invention.

FIG. 5 is a block diagram of a computer system according to one embodiment of an Inquiry Assessment Platform 400 ("IA Platform"). This computer system may reside either on the client side, the server side, or some combination thereof. In this embodiment, the IA Platform may serve to aggregate, process, store, search, serve, identify, instruct, generate, match, and/or facilitate tutoring interactions with a computer. Aggregated data may be stored for later retrieval, analysis, and manipulation, which may be facilitated through a database program 437, or one or more computer-implemented tables 450 (collectively, 450a, 450b, 450c, 450d, 450e, 450f, 450g, and 450h in FIG. 5).

In one embodiment, the IA Platform 400 may be connected to and/or communicate with entities such as, but not limited to: one or more users from user input devices (e.g., Flash/SD/SSD); peripheral devices, e.g., a simulation environment; an optional cryptographic processor device; and/or a communications network 420. Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers 439 may serve their information to requesting "client(s)". The term "client" as used herein refers generally to a computer, program, other device, user and/or combination thereof that is capable of processing and making requests and obtaining and processing any responses from servers across a communications network. Various client-server architecture and configurations are suitable, as well as other than a client-server architecture is suitable. For example, a web-based system may be utilized to implement the present invention as well as a monolithic (running on one machine) or semi-monolithic system (e.g., installed and running on a tablet that send data to a server).

The processor and/or transceivers may be connected as either internal and/or external peripheral devices (e.g., sensors 456) via the I/O ports 455. In turn, the transceivers may be connected to antenna(s) 457, thereby effectuating wireless transmission and reception of various communication and/or sensor protocols. The CPU 451 comprises at least one high-speed data processor adequate to execute program components for executing user and/or system-generated requests. Embedded components may include software solutions, hardware solutions, and/or some combination of both hardware/software solutions. Storage interfaces, e.g., data store 431, may accept, communicate, and/or connect to a number of storage devices such as, but not limited to: storage devices, removable disc devices, solid state drives (SSD) and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network card(s) may accept, communicate, and/or connect to a communications network 420. Through a communications network 420, the IA Platform is accessible through remote clients (e.g., computers with web browsers) by users. Network interfaces 454 may employ connection protocols such as, but not limited to: direct connect, Ethernet (thick, thin, twisted pair 10/100/1000 Base T, and/or the like), Token Ring, wireless connection such as IEEE 802.11a-x, and/or the like. A cloud service 425 may be in communication with the IA Platform. The cloud service 425 may include a Platform-as-a-Service (PaaS) model layer 425a, an Infrastructure-as-a-Service (IaaS) model layer 425b and a Software-as-a-Service (SaaS) model layer 425c. The SaaS model layer 425c generally includes software managed and updated by a central location, deployed over the Internet and provided through an access portal. The PaaS model layer 425a generally provides services to develop, test, deploy, host and maintain applications in an integrated development environment. The IaaS layer model layer 425b generally includes virtualization, virtual machines, e.g., virtual servers, virtual desktops and/or the like.

Input Output interfaces (I/O) 455 may accept, communicate, and/or connect to user input devices, peripheral devices, cryptographic processor devices, and/or the like. Peripheral devices may be connected and/or communicate to I/O and/or other facilities of the like such as network interfaces, storage interfaces, directly to the interface bus, system bus 458, the CPU 451, and/or the like. Peripheral devices may be external, internal, and/or part of IA Platform. Peripheral devices may include: eye tracking equipment, antenna 457, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices), force-feedback devices (e.g., vibrating motors), network interfaces 454, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

Generally, any mechanization and/or embodiment allowing a processor to affect the storage and/or retrieval of information is regarded as memory. It is to be understood that the IA Platform and/or a computer systems may employ various forms of memory. In a typical configuration, memory includes ROM/RAM 452, a cache 453, and a storage device. A storage device may be any conventional computer system storage. Storage devices may include a (fixed and/or removable) magnetic disk drive; a magneto-optical drive; an optical drive; an array of devices (e.g., Redundant Array of Independent Disks (RAID)); solid state memory devices (USB memory, solid state drives (SSD), etc.); other processor-readable storage mediums; and/or other devices of the like. Thus, a computer system 403 generally requires and makes use of non-transitory and/or transitory memory.

A user interface component 441 is a stored program component that is executed by a CPU 451. The user interface 441 may be a graphical user interface such as simulation user interface 310 and provided by, with, and/or atop operating systems 433 and/or operating environments. The user interface may allow for the display, execution, interaction, manipulation, and/or operation of program components and/or system facilities through textual and/or graphical facilities. The user interface 441 provides a facility through which users may affect, interact, and/or operate a computer system 403. A user interface 441 may communicate to and/or with one or more other components 435 (collectively, 435a, 435b, 435c, and 435d in FIG. 4) in a component collection, including itself, and/or facilities of the like.

The structure and/or operation of any of the IA Platform engine set 405 may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that may dynamically load the components on demand in an integrated fashion. The Engine Set 405 components may be consolidated and/or distributed in countless variations through standard data processing and/or development techniques. Multiple instances of any one of the program components in the program component collection 435 may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques. The component collection 435 may be components for implementing system 100 or system 300 described above in FIGS. 1 and 3, respectively.

The configuration of the IA Platform depends on the context of system deployment. Factors such as, but not limited to, the budget, capacity, location, and/or use of the underlying hardware resources may affect deployment requirements and configuration. Regardless of whether the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

In certain embodiments, the procedures, devices, and processes described herein constitute a computer program product, including a computer readable medium, e.g., a removable storage medium such as one or more DVD-ROM's, CD-ROM's, diskettes, tapes, etc., that provides at least a portion of the software instructions for the system. Such a computer program product may be installed by any suitable software installation procedure, as is well known in the art. In another embodiment, at least a portion of the software instructions may also be downloaded over a cable, communication and/or wireless connection.

Embodiments may also be implemented as instructions stored on a non-transitory machine-readable medium, which may be read and executed by one or more processors. A non-transient machine-readable medium may include any mechanism for storing or transmitting information in a form readable by a machine, e.g., a computing device 403. For example, a non-transient machine-readable medium may include read only memory (ROM); random access memory (RAM); magnetic disk storage media; optical storage media; flash memory devices; and others.

It should be understood that the example embodiments described above may be implemented in many different ways. In some instances, the various methods and machines described herein may be implemented by a physical, virtual, or hybrid general-purpose computer, or a computer network environment such as the computer network environment 420. A general purpose computer may be transformed into the machines that execute the methods described above, for example, by loading software instructions into memory or nonvolatile storage for execution by a central processing unit.

Embodiments or aspects thereof may be implemented in the form of hardware, firmware, or software or any combination thereof. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of data processors. However, it should be appreciated that such descriptions contained herein are merely for convenience and that such actions in fact result from computing devices, processors, controllers, or other devices executing the firmware, software, routines, instructions, etc.

It also should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, one or more servers, one or more clients, and/or some combination thereof, and, thus, the data processors described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

For example, further details of other embodiments may be found in at least the following three publications, that are hereby incorporated by reference: (1) Sao Pedro, M. A., Baker, R. S. J. d., and Gobert, J. D. (2012), *Improving Construct Validity Yields Better Models of Systematic Inquiry, Even with Less Information*, In Proceedings of the 20th Conference on User Modeling, Adaptation, and Personalization (Montreal, QC, Canada 2012), 249-260; (2) Sao Pedro, M. A., Baker, R. S. J. d., Gobert, J. D., Montalvo, O., and Nakama, A., *Leveraging Machine-Learned Detectors of Systematic Inquiry Behavior to Estimate and Predict Transfer of Inquiry Skill*, User Modeling and User-Adapted Interaction (2013), 23(1), 1-39; (3) Gobert, J. D., Sao Pedro, M. A., Baker, S. J. d., Toto, E., and Montalvo, O., *Leveraging educational data mining for real time performance assessment of scientific inquiry skills within microworlds*, Journal of Educational Data Mining, 4, 1 (2012), 111-143; Gobert, J. D., Sao Pedro, M. A., Raziuddin, J., Baker, R. S., *From Log Files to Assessment Metrics: Measuring Students' Science Inquiry Skills Using Educational Data Mining, Journal of the Learning Sciences,* 22: 521-563 (2013).

What is claimed is:

1. A method, comprising:
   in a computer, collecting information from a subject person;
   defining, by the computer, one or more measurable science competencies by constructing a decision tree with an associated detector; and
   in the computer, providing, based on the constructed decision tree and the associated detector, a real-time communication indicating whether the one or more science competencies of the subject person as assessed within a virtual environment match the collected information of the subject person, when the subject person performs at least one of:
   generating hypotheses;
   collecting data to test the hypotheses;
   interpreting the collected data;
   warranting claims with data; and
   communicating respective findings.

2. The method of claim 1, further comprising a tracking model that tracks the one or more science assessed competencies of the subject person across one or more science topics or science domains including at least one physics, physical sciences, chemistry, life sciences, geosciences, biological sciences, nursing, medicine, medical sciences, physiological sciences, natural sciences, formal sciences, social sciences, technical domains, vocational domains, computer sciences, computational thinking, engineering, electronics, and troubleshooting.

3. The method of claim 1, further comprising generating a real-time communication to another person based upon measuring of the one or more science competencies, and responsive to the real-time communication, the another person providing at least a portion of the real-time feedback to the subject person.

4. The method of claim 1, wherein the one or more science competencies include at least one of, or any subskill of: a data collection skill, a data interpretation skill, a hypothesis skill, a question-asking skill, a claim warranting skill, a communicating findings skill, a communicating explanations skill, an argumentation skill, an identifying an independent variable skill, an identifying a dependent variable skill, a defining a relationship between variables skill, a designing a controlled experiment skill, a testing a stated hypothesis skill, a warranting an interpretation skill, a relating an interpretation to a hypothesis skill, reasoning, critical thinking, and problem solving.

5. The method of claim 1, further comprising:
   measuring the one or more science competencies of the subject person, the measuring being in real-time and using at least one of an assessment model and a tracking model programmed to infer science competency demonstration from interactive engagement by the subject person with the virtual environment; and
   providing to the subject person real-time feedback through the virtual environment.

6. The method of claim 1, further comprising providing the real-time communication to another person, the real-time communication including at least one of:
   an alert associated with the one or more science competencies of the subject person; and
   an assessment of the one or more science competencies of the subject person.

7. The method of claim 1, further comprising providing the real-time communication to the subject person, the real-time communication including tutoring of the one or more science competencies for the subject person.

8. The method of claim 1, further comprising:
   providing a real-time assessment of the one or more science competencies of the subject person based upon data measured from an eye tracking system monitoring the subject person; and
   providing real-time communication indicating whether the subject person is attending to one or more aspects of at least one of a text or diagram associated with the virtual environment based upon the subject person's understanding of a target domain and based upon the real-time assessment.

9. The method of claim 1, wherein:
   generating hypotheses includes forming and asking questions and defining problems;
   collecting data to test the hypothesis includes planning and carrying out investigations using models;
   interpreting the collected data includes analyzing the collected data;
   warranting claims with data includes engaging in arguments from evidence; and
   communicating respective findings includes generating explanations from the collected data and designing solutions from the collected data.

10. The method of claim 1, further comprising providing at least one of:
    a real-time assessment of the one or more science competencies of the subject person based upon at least one of a pattern of the subject person and a decision of the subject person; and
    any of a certification for licensure, a certification for a course, and a certification for a lesson.

11. A system, comprising:
    a computing module configured to collect information from a subject person;
    a processing module configured to define one or more measurable science competencies by constructing a decision tree with an associated detector; and
    a user interface module configured to provide, based on the constructed decision tree and the associated detector, a real-time communication indicating whether the one or more science competencies of the subject person as assessed within a virtual environment match the information collected from the subject person, when the subject person performs at least one of:
generating hypotheses;
collecting data to test the hypotheses;
interpreting the collected data;
warranting claims with data; and
communicating respective findings.

12. The system of claim 11, wherein the user interface module is further configured to generate a real-time communication to another person based upon at least one of measurement and tracking of the one or more science competencies by the computing module, and responsive to the real-time communication, the another person providing at least a portion of the real-time feedback to the subject person.

13. The system of claim 11, wherein the one or more science competencies include at least one of, or any subskill of: a data collection skill, a data interpretation skill, a hypothesis skill, a question-asking skill, a claim warranting skill, a communicating findings skill, a communicating explanations skill, an argumentation skill, an identifying an independent variable skill, an identifying a dependent variable skill, a defining a relationship between variables skill, a designing a controlled experiment skill, a testing a stated hypothesis skill, a warranting an interpretation skill, a relating an interpretation to a hypothesis skill, reasoning, critical thinking, and problem solving.

14. The system of claim 11, further comprising:
the computing module being configured to perform at least one of measurement and tracking, in real-time, of the one or more science competencies of the subject person and to use at least one of an assessment model and a tracking model programmed to infer science competency demonstration from interactive engagement by the subject person with the virtual environment; and
the user interface module being further configured to provide to the subject person real-time feedback through the virtual environment.

15. The system of claim 11, wherein the user interface module is further configured to provide the real-time communication to another person, the real-time communication including at least one of:
an alert associated with the one or more science competencies of the subject person; and
an assessment of the one or more science competencies of the subject person.

16. The system of claim 11, wherein the user interface module is further configured to provide the real-time communication to the subject person, the real-time communication including tutoring of the one or more science competencies for the subject person.

17. The system of claim 11, wherein the user interface module is further configured to:
provide a real-time assessment of the one or more science competencies of the subject person based upon data measured from an eye tracking system monitoring the subject person; and
provide real-time communication indicating whether the subject person is attending to one or more aspects of at least one of a text or diagram associated with the environment based upon the subject person's understanding of a target domain and based upon the real-time assessment.

18. The system of claim 11, wherein:
generating hypotheses includes forming and asking questions and defining problems;
collecting data to test the hypothesis includes planning and carrying out investigations using models;
interpreting the collected data includes analyzing the collected data;
warranting claims with data includes engaging in arguments from evidence; and
communicating respective findings includes generating explanations from the collected data and designing solutions from the collected data.

19. The system of claim 11, wherein the user interface module is further configured to provide at least one of:
a real-time assessment of the one or more science competencies of the subject person based upon at least one of a pattern of the subject person and a decision of the subject person; and
any of a certification for licensure, a certification for a course, and a certification for a lesson.

20. A computer program product providing a tutoring agent comprising:
a non-transitory computer useable medium having a computer readable program;
wherein the computer readable program when executed on a computer causes the computer to:
collect information from a subject person;
define one or more measurable science competencies by constructing a decision tree with an associated detector; and
provide, based on the constructed decision tree and the associated detector, a real-time communication indicating whether the one or more science competencies of the subject person as assessed within a virtual environment match the information collected from the subject person, when the subject person performs at least one of:
generating hypotheses;
collecting data to test the hypotheses;
interpreting the collected data;
warranting claims with data; and
communicating respective findings.

* * * * *